United States Patent
Janik

(10) Patent No.: US 10,530,290 B2
(45) Date of Patent: Jan. 7, 2020

(54) SYSTEM AND METHOD FOR HYBRID POWER GENERATION

(71) Applicant: ELECTRONIC POWER DESIGN, Houston, TX (US)

(72) Inventor: John Bradford Janik, Houston, TX (US)

(73) Assignee: Electronic Power Design, Inc., Houston, TX (US)

( * ) Notice: Subject to any disclaimer, the term of this patent is extended or adjusted under 35 U.S.C. 154(b) by 339 days.

(21) Appl. No.: 15/438,697

(22) Filed: Feb. 21, 2017

(65) Prior Publication Data

US 2017/0302218 A1    Oct. 19, 2017

Related U.S. Application Data

(63) Continuation-in-part of application No. 14/558,489, filed on Dec. 2, 2014, now Pat. No. 9,365,265.
(Continued)

(51) Int. Cl.
| | |
|---|---|
| B60W 30/00 | (2006.01) |
| H02S 10/10 | (2014.01) |
| F02B 63/04 | (2006.01) |
| F02D 41/04 | (2006.01) |
| F02D 41/14 | (2006.01) |
| G05B 15/02 | (2006.01) |

(Continued)

(52) U.S. Cl.
CPC .............. *H02S 10/10* (2014.12); *B63B 21/50* (2013.01); *B63J 3/00* (2013.01); *F02B 63/04* (2013.01); *F02D 41/04* (2013.01); *F02D 41/1405* (2013.01); *G05B 15/02* (2013.01); *G06Q 10/06312* (2013.01); *H02J 7/355* (2013.01); *H02P 7/18* (2013.01); *H02S 40/38* (2014.12); *B63B 2021/505* (2013.01); *G06Q 50/06* (2013.01)

(58) Field of Classification Search
None
See application file for complete search history.

(56) References Cited

U.S. PATENT DOCUMENTS

| | | | | |
|---|---|---|---|---|
| 5,319,556 | A | * 6/1994 | Bessacini | ................ F41G 7/228 |
| | | | | 114/238 |
| 5,898,282 | A | * 4/1999 | Drozdz | ............... B60L 15/2045 |
| | | | | 318/139 |

(Continued)

*Primary Examiner* — Jonathan M Dager
(74) *Attorney, Agent, or Firm* — G. Michael Roebuck, PC

(57) ABSTRACT

A hybrid power generation system is disclosed including but not limited to a processor in data communication with a non-transitory computer readable medium for controlling a plurality of power sources to substantially optimize energy generation by the plurality of power sources, wherein the plurality of power sources comprise a solar panel and a battery that generate energy; a computer program comprising instructions stored in the non-transitory computer readable medium that are executed by the processor, the computer program comprising, instructions to determine a current operating state for each of the plurality of power sources; instructions to determine a new operating state for each of the plurality of power sources to substantially optimize power generated for each of the power sources; and instructions to replace the current operating state for each of the plurality of power sources to the new operating state for each of the plurality of power sources.

17 Claims, 4 Drawing Sheets

Related U.S. Application Data

(60) Provisional application No. 62/297,636, filed on Feb. 19, 2016.

(51) Int. Cl.

| | | |
|---|---|---|
| *H02S 40/38* | (2014.01) | |
| *H02J 7/35* | (2006.01) | |
| *B63B 21/50* | (2006.01) | |
| *B63J 3/00* | (2006.01) | |
| *H02P 7/18* | (2006.01) | |
| *G06Q 10/06* | (2012.01) | |
| *G06Q 50/06* | (2012.01) | |

(56) References Cited

U.S. PATENT DOCUMENTS

| | | | | |
|---|---|---|---|---|
| 8,271,175 B2* | 9/2012 | Takenaka | B60T 8/17551 | 701/70 |
| 8,662,220 B2* | 3/2014 | Burkholder | B60W 10/06 | 180/65.275 |
| 8,670,888 B1* | 3/2014 | Brenner | B60L 15/2045 | 701/22 |
| 9,129,456 B2* | 9/2015 | Keates | F02D 41/086 | |
| 9,836,574 B2* | 12/2017 | Willard | B60K 37/02 | |
| 2004/0030469 A1* | 2/2004 | MacBain | B60K 6/48 | 701/22 |
| 2004/0034460 A1* | 2/2004 | Folkerts | B60W 30/188 | 701/54 |
| 2004/0074682 A1* | 4/2004 | Fussey | B60L 58/13 | 180/65.21 |
| 2006/0066146 A1* | 3/2006 | Otomo | B60T 8/26 | 303/151 |
| 2006/0208570 A1* | 9/2006 | Christian | B60L 58/12 | 307/10.1 |
| 2009/0105896 A1* | 4/2009 | Tamai | B60K 6/365 | 701/22 |
| 2009/0198396 A1* | 8/2009 | Rodriguez | B60W 10/08 | 701/22 |
| 2009/0227417 A1* | 9/2009 | Imamura | B60K 6/445 | 477/5 |
| 2010/0125383 A1* | 5/2010 | Caouette | B63H 21/17 | 701/21 |
| 2011/0281478 A1* | 11/2011 | Blumenthal | B63B 35/44 | 440/6 |
| 2012/0028515 A1* | 2/2012 | Stasolla | B63H 21/20 | 440/3 |
| 2012/0083173 A1* | 4/2012 | McMillan | B63H 21/20 | 440/6 |
| 2012/0101671 A1* | 4/2012 | Caouette | B63H 21/17 | 701/21 |
| 2012/0239228 A1* | 9/2012 | Vos | F01D 15/02 | 701/3 |
| 2013/0190956 A1* | 7/2013 | Zhamu | B61C 7/04 | 701/22 |
| 2013/0241444 A1* | 9/2013 | Fotherby | H02M 7/48 | 318/51 |
| 2013/0274967 A1* | 10/2013 | Tan | B60W 10/04 | 701/22 |
| 2013/0307444 A1* | 11/2013 | Settemsdal | B60L 7/14 | 318/139 |
| 2013/0313894 A1* | 11/2013 | Settemsdal | H02J 4/00 | 307/9.1 |
| 2013/0325214 A1* | 12/2013 | Vos | B60W 20/00 | 701/3 |
| 2014/0148304 A1* | 5/2014 | Pietron | B60W 10/02 | 477/5 |
| 2014/0257615 A1* | 9/2014 | Tan | B60W 20/13 | 701/22 |
| 2015/0134162 A1* | 5/2015 | Yamazaki | B60W 20/13 | 701/22 |
| 2015/0239546 A1* | 8/2015 | Limseth | B63H 23/24 | 440/6 |
| 2016/0006275 A1* | 1/2016 | Lee | G01R 31/367 | 320/112 |
| 2016/0052397 A1* | 2/2016 | Meyer | B60L 58/12 | 701/22 |
| 2016/0159625 A1* | 6/2016 | Janik | B66D 1/485 | 701/21 |
| 2016/0207404 A1* | 7/2016 | Melz | B60K 6/24 | |
| 2016/0347421 A1* | 12/2016 | Janik | B63B 21/50 | |
| 2017/0203660 A1* | 7/2017 | He | B60L 11/1816 | |
| 2017/0234250 A1* | 8/2017 | Janik | B63B 21/50 | 700/286 |
| 2018/0334177 A1* | 11/2018 | Myers | B60L 50/10 | |
| 2019/0173295 A1* | 6/2019 | Morin | H02J 7/0021 | |

\* cited by examiner

SYSTEM AND METHOD FOR HYBRID POWER GENERATION

CROSS REFERENCE TO RELATED APPLICATIONS

This patent application claims priority from U.S. Provisional Patent Application No. 62/286,705 by John B. Janik, entitled "System and Method for Energy Management Using Linear Programming", filed on Jan. 25, 2016, and claim priority from U.S. patent application Ser. No. 15/415,797 filed on Jan. 25, 2017 by Janik entitled System and Method for Energy Management Using Linear Programming, and claims priority from U.S. patent application Ser. No. 14/558,489 filed on Dec. 2, 2014, now U.S. Pat. No. 9,365,265 by John B. Janik, issued on May 25, 2016 and entitled "Hybrid Winch with Controlled Release and Torque Impulse Generation" and claims priority from U.S. Provisional Patent Application No. 62/297,636 filed on Feb. 19, 2016 by John B. Janik entitled SYSTEM AND METHOD FOR HYBRID POWER GENERATION, all four of these patent application are hereby incorporated by reference herein in their entirety.

BACKGROUND OF THE INVENTION

The use of renewable energy sources such as sun light, wind and water to produce electrical energy has become popular in recent years.

FIELD OF THE INVENTION

The field of the invention is optimization of renewable energy power sources and in particular the efficient use of renewable energy power sources to efficiently generate power.

SUMMARY OF THE INVENTION

A hybrid power generation system is disclosed including but not limited to a processor in data communication with a non-transitory computer readable medium for controlling a plurality of power sources to substantially optimize energy generation by the plurality of power sources, wherein the plurality of power sources comprise a solar panel and a battery that generate energy; a computer program comprising instructions stored in the non-transitory computer readable medium that are executed by the processor, the computer program comprising, instructions to determine a current operating state for each of the plurality of power sources; instructions to determine a new operating state for each of the plurality of power sources to substantially optimize power generated for each of the power sources; and instructions to replace the current operating state for each of the plurality of power sources to the new operating state for each of the plurality of power sources.

BRIEF DESCRIPTION OF THE DRAWINGS

The invention will be better understood in reference to the following drawings, which are examples of an illustrative embodiment and are not limiting as different embodiments of the invention may be realized.

Figure 1:
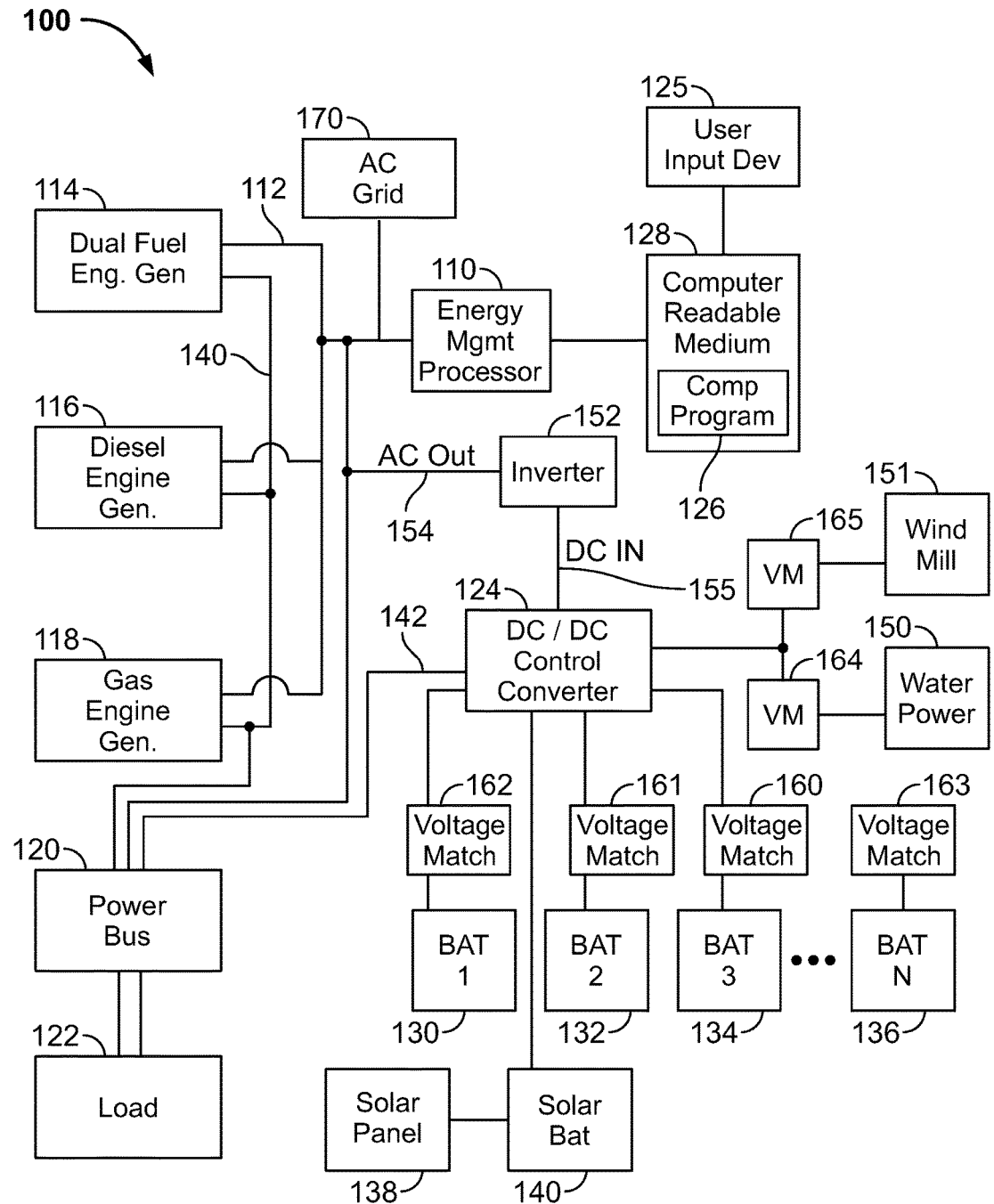
FIG. 1 is a schematic depiction of an illustrative embodiment of the invention showing a system for hybrid power generation and energy management.

Each of the plurality of power sources has a profile which includes but is not limited to an operating state for the power source. In one particular illustrative embodiment of the invention a system is disclosed including but not limited to a processor; a hybrid power source for servicing a system load, the hybrid power source including but not limited to a natural gas engine and a diesel engine; a computer program comprising, instructions determining a current system load serviced by power provided from the hybrid power source; instructions to determine a current operating state for the natural gas engine, the diesel engine and the battery; instructions to use linear programming to determine an more efficient operating state for the natural gas engine, the diesel engine and the battery to reduce for power consumption servicing the current system load the natural gas engine, the diesel engine and the battery; and instructions to replace the current operating state for the natural gas engine, the diesel engine and the battery with the more efficient operating state for the natural gas engine, the diesel engine and the battery. A method is disclosed for using the system. In another illustrative embodiment of the invention, several types of stored energy DC power source batteries are added to the hybrid power generation system as another energy source to be used to provide energy.

In a particular illustrative embodiment of the invention, a controller and non-transitory computer readable medium, having a computer program stored in a non-transitory computer readable medium, wherein the computer program controls a System and Method for Hybrid Power Generation that substantially improves efficiency in Hybrid Power Generation.

In another illustrative embodiment of the present invention provides a controller having a computer program programmed as "Linear Algebra" (also referred to as herein as "Linear" and "Linear Programming"). The linear computer program is stored in a non-transitory computer readable medium, wherein the Linear Algebra, or the solutions to simultaneous non-equalities, to yield substantially improved efficiency and substantially least efficiency solutions to active Hybrid Power Generation. In an illustrative embodiment of the invention a system and method provides a substantially most efficient use of Solar panels that harvest solar energy and convert the solar energy to electrical energy, the charging of stored energy devices, the discharging of stored energy devices, engine generator power, utility power and total and partial energy consumption and management.

In another particular illustrative embodiment, a controller having a computer program is provided for controlling the combined use of power source including but not limited natural gas engines, diesel/natural gas duel fuel engines and battery power stored in a battery for energy for management generating energy and in supplying energy to a system load being serviced by a combination of the power sources including but not limited to natural gas engines, the diesel/natural gas dual fuel, wind driven power generators, water driven power generators, solar driven power generators and the battery power. The computer program determines a current system load being serviced by the power sources including but not limited to natural gas engines, diesel/ natural gas duel fuel and battery power and determines a current load on each one of the power sources such as natural gas engines, the diesel/natural gas duel fuel engine and the battery power. The computer program adjusts the usage of each of the power sources including but not limited to natural gas engines, diesel/natural gas duel fuel engine and battery power for economically servicing the system load. The computer program adjusts the usage of each of the power sources including but not limited to natural gas engines, diesel/natural gas duel fuel engine and battery power for reducing the power used for servicing the system load. A method is disclosed for using the System for Hybrid Power Generation. The term "computer program" as used herein is used to refer to a computer program comprising instructions stored in a non-transitory computer readable medium that are executed by a processor. The term "computer program" is also used herein to refer to a neural network, an analytical model, a linear program and an expert system.

Linear programming, neural networks, analytical models and expert systems are well known in the art and can be adapted according the invention described herein to perform hybrid power generation as described herein. Numerous patents and articles currently describe the use and adaptation of linear programming, neural networks, analytical models and expert systems. A tutorial and description of the use of linear programming that can be adapted and used in one particular illustrative embodiment of the present invention is described in the book *Linear programming*, by Vasek Chvatal, W. H. Freeman and Company, New York, 1983. An example how to use of using linear programming to find an optimal fuel mixture for each generator at each time period and under each scenario using linear programming; and repeating the previous two steps as long as the fuel mixture obtained from the linear programming solution changes is shown in U.S. Pat. No. 6,021,402 to Takriti, which is hereby incorporated herein by reference in its entirety. An example of an energy management system that uses an expert system as an energy management system uses an expert engine and a numerical solver to determine an optimal manner of using and controlling the various energy consumption, producing and storage equipment in a plant/communities in order to for example reduce energy costs within the plant, and is especially applicable to plants that require or that are capable of using and/or producing different types of energy at different times. The energy management system operates the various energy manufacturing and energy usage components of the plant to minimize the cost of energy over time, or at various different times, while still meeting certain constraints or requirements within the operational system, such as producing a certain amount of heat or cooling, a certain power level, a certain level of production, etc. in U.S. Pat. No. 9,335,748 to Francino, which is hereby incorporated herein by reference in its entirety. In another particular illustrative embodiment of the invention, the Energy Management Processor of the present invention is programmed as an expert system to perform energy management as described herein. In another particular illustrative embodiment of the invention, the Energy Management Processor of the present invention is programmed as a neural network to perform energy management as described herein.

Systems and methods are described herein for combining natural gas generators and diesel fuel generators on the same electrical bus power land drill rigs. The good points of this arrangement is that it enables a drilling contractor make use of very cheap locally produced natural gas to run the engine—generation needs for the drilling activities, thus greatly reducing expenses to operate a land drilling rig. The problem solved with this arrangement is that the natural gas generator has very poor speed response and cannot handle the high transient loads such as raising a draw works. To get even close to the high transient required response, the natural gas engine-generator is typically pre-loaded to 25-75% which consumes additional gas and wears out the gas generator out prematurely due to the continuous duty cycle.

In a particular illustrative embodiment of the invention, a system and method are disclosed to provide a solution by a plurality of power sources to the system with ad DC-AC converter to allow fast transient response of the hybrid power generation system. On land based oil rigs, natural gas is relatively low cost and readily accessible as a by-product of operating the oil rig.

Dual fuel engines run on diesel and natural gas simultaneously. Using a dual fuel engine can reduce fuel cost per rig per month as it uses natural gas from the oil rig and when use in conjunction with the Hybrid Power Generation System disclosed herein is used intermittently as needed rather than being preload and continuously running, and thus has a lower duty cycle. Continuously running the natural gas engine during preload both wastes natural gas and shortens the life of the natural gas engine as it is worn out from running all the time during preload.

FIG. 1 depicts a particular illustrative embodiment of the invention as a system provided using a computer program for energy management. In another illustrative embodiment, the computer program includes but is not limited to a linear program, a neural network and an expert system. Turning now to FIG. 1, in a particular illustrative embodiment of the invention, a dual fuel engine generator 114 is combined with a single gas engine 118, diesel engine 116, wind-powered DC power generator (for example a wind mill) 151, water-powered DC generator (for example a water wheel driven by flowing water) 150, inverter 152, voltage matching DC/DC voltage matching converters 160-165 and batteries 130, 132, 134 and 136. The DC/DC voltage matching converters match the voltage generated by the DC generating power sources to the voltage generated by the solar panel and solar panel solar power storage battery. In a particular illustrative embodiment, additional DC power sources that generate DC energy to provide power in the hybrid energy management system are provided as a wind mill 151, solar panel 138, solar power storage battery 140. Excess power generated is sent to an AC grid 170. DC power generated is sent to inverter 152 to converter the DC power generated by the power sources to AC power. In another illustrative embodiment of the invention, the battery is not used. In another particular illustrative embodiment of the invention two diesel fuel engine generators are combined with a duel fuel engine generator and a battery. In another particular illustrative embodiment of the invention, all natural gas engine generators are provided and along with a battery. These illustrative embodiments of systems in the present invention are controlled by a processor using a computer program. In another embodiment the computer program is a linear program to achieve a high efficiency of use between the engine generators and the battery. In another illustrative embodiment the computer program a neural network that is used to achieve a high efficiency of use between the engines and the battery. In another illustrative embodiment an the computer program is an expert system that is used to achieve a high efficiency of use between the engine generators and the battery.

In a particular illustrative embodiment of present invention, the Hybrid Power Generation System, Dual Fuel Engine Generators (also referred to herein as "Dual Fuel Generators"), Gas Generators (also referred to herein as "Gas Engine Generators") and DC power batteries and DC power sources are provided to provide high power generation capacity to handle high instantaneous torque requirements and long duty cycle ongoing power requirements. In another embodiment the Gas Generator and DC power converter to Batteries 1-N are provided with a Dual Fuel Generator and with a Diesel Generator (also referred to as "Diesel Engine Generators"). An Energy Management Processor is provided to execute a computer program to energy management hybrid power generation control of "power sources" as follows: Dual Fuel Generator 114 combined with the Gas Generator 118, Diesel engine 116 the DC/DC Converter Controller 124 and DC power from wind-powered DC power generator (for example a wind mill) 151, water-powered DC generator (for example a water wheel driven by flowing water) 150, inverter 152, voltage matching DC/DC converters 160, 161 and 162, and batteries 130, 132, 134 and 136 (collectively referred to herein as "power sources"). The Energy Management Processor monitors power generated by the AC and DC power sources to satisfy the requirements from the Load 122 and efficiently shares the load between the AC power sources (including but not limited to the Dual Fuel Generator 114, single gas engine 118, diesel engine generator 116) and the DC power sources (including but not limited to batteries 130, 132, 134 and 136, wind mill, solar panel and water power generator 150). DC/DC Converter Controller 124 based on the load requirements and an efficient balance of power generation for the current load requirements based on linear programming in the Energy Management Processor. The Energy Management Processor provides substantially efficient use of the AC power sources including but not limited to Dual Fuel Generator 114, single gas engine 118, diesel engine 116 and the DC power sources attached to DC/DC Converter Controller 124 for substantially optimizing power generation and providing power to handling load 122 including but not limited to base loads and loads requiring torque transients.

In another particular illustrative embodiment of the invention, the Energy Management Processor computer program 126 that is stored on computer readable medium 128 reads a profile and current operating state for all of the AC and DC power sources, and determines a substantially optimally efficient operating state for efficiently producing energy from the AC and DC power sources to service the load at the current time including based load and transient load peaks. In another particular illustrative embodiment of the invention, the Energy Management Processor computer program 126 on computer readable medium 128 reads an operating state for all of the AC and DC power sources, and determines a substantially optimally efficient operating state for efficiently producing energy at the current time for each of the DC and AC power sources. The operating state for the Dual Fuel Generator and diesel generator includes but is not limited to engine revolutions per minute (RPM), variable frequency of a supply voltage, torque, plot point on a speed torque curve for the Dual Fuel Generator. The profile for the Dual Fuel Generator includes but is not limited to the profile and the particular characteristics for the dual fuel generator including but not limited to speed versus torque curves, capacity, duty cycle history, maintenance schedule, fuel level and speed in revolutions per minute. The profile for the diesel Generator includes but is not limited to the profile and the particular characteristics for the dual fuel generator including but not limited to speed versus torque curves, capacity, duty cycle history, maintenance schedule, fuel level and speed in revolutions per minute An operating state for batteries 130, 132, 134 and 136 includes but is not limited to percent charged to charge capacity, cost per kilowatt hour generated, battery type and plot point on a battery life to power output capacity curve for each battery type 130, 132, 134 and 136 and battery chemistry for each battery type used in the system. The profile for the batteries includes but is not limited to the operating state and the particular characteristics for the battery. In particular illustrative embodiment, the battery types include but are not limited to Aluminium-ion battery, Flow battery, Vanadium redox battery, Zinc-bromine battery. Zinc-cerium battery, Lead-acid battery, Deep cycle battery, VRLA battery, AGM battery, Gel battery, Lithium air battery, Lithium-ion battery, Lithium ion lithium cobalt oxide battery (ICR), Lithium ion manganese oxide battery (IMR), Lithium ion polymer battery, Lithium iron phosphate battery, Lithium-sulfur battery, Lithium-titanate battery, Thin film lithium-ion battery, Magnesium-ion battery, Molten salt battery, Nickel-cadmium battery, Nickel-cadmium battery vented cell type, Nickel hydrogen battery, Nickel-iron battery, Nickel metal hydride battery, Low self-discharge NiMH battery, Nickel-zinc battery, Organic radical battery, Polymer-based battery, Polysulfide bromide battery, Potassium-ion battery, Rechargeable alkaline battery, Rechargeable fuel battery, Silicon air battery, Silver-zinc battery, Silver calcium battery, Sodium-ion battery, Sodium-sulfur battery, Sugar battery, Super iron battery, UltraBattery and Zinc ion battery. Any type of rechargeable or non-rechargeable battery can be used as a DC power source in a particular embodiment of the invention. In a particular illustrative embodiment of the invention, a high power high capacity battery 130 and low performance low cost battery 132. Voltage matching DC/DC converters 160-165 match a voltage output from Battery 3, Battery 2, Battery 1, Battery N, water power and wind mill respectively to a voltage output by solar panels 138 which are output to DC/DC control converter 124. DC/DC control converter 124 outputs a DC voltage to inverter 152. Inverter 152 converters the DC power input to an AC voltage to supply energy to a load or to an AC grid 170. Each of the profiles includes but is not limited to an operating state and a cost per kilowatt hour of energy generated by the AC or DC power source with which the profile is associated. An operating state for the DC power sources solar panels and solar cones include but are not limited to cloud cover, available sun light, time of day, date of year and temperature. (DC power solar power sources (solar panels and solar cones) include but are not limited to solar cones include but are not limited to photovoltaic panels or photovoltaic cones, spinning solar cones from V3 Solar, silicon microfunnels. In 2012, nuclear and materials scientists at MIT devised a theory that involved the semiconductor potential of monolayer MoS2. With any semiconductor, engineers must tweak its lattice in some way to switch electron flows on and off. With silicon, the tweak involves introducing slight chemical impurities into the lattice. In their simulation, the MIT researchers tweaked MoS2 by stretching its lattice. Using virtual pins, they poked a monolayer to create nanoscopic funnels, stretching or tensioning the lattice and, theoretically, altering MoS2's band gap. Band gap measures how much energy it takes to move an electron. The simulation suggested the funnel would strain the lattice the most at the point of the pin, creating a variety of band gaps from the bottom to the top of the monolayer. The MIT researchers theorized that the funnel would be a great solar energy collector, capturing more sunlight across a wide swath of energy frequencies. Stanford News, June 2015). In another particular illustrative embodiment of the invention, the photovoltaic cones include a photovoltaic cone surface that is tensioned or stretched under control of the energy management processor to increase DC power generated by the photovoltaic cone. A profile for the wind mill includes but the operating state for the wind mill revolutions per minute, cost per kilowatt hour, percent of full energy generating capacity the operating state and the particular characteristics for the wind mill. The Energy Management Processor achieves a substantially efficient load share by using a linear programming computer program stored on a computer readable medium to efficiently share the load of power generation to provide power a substantially reduced cost based on the current operating state for the power sources. In another embodiment of the invention, a battery is provided as another source to handle loads instantaneous torque requirements. In another embodiment of the invention, the battery is a solar power charged battery storage. In another embodiment of the invention, the batteries are provided to service high torque loads and the diesel engines are eliminated. In a particular illustrative embodiment, the oil rig is a land-based oil rig. Linear programming is one of several mathematical technique that attempt to solve problems by minimizing or maximizing a function of several independent variables. LP is widely used of these methods and is one of the best for analyzing complex industrial systems. The LP technique is more flexible than methods based on solving a system of equations for heat and material balances. For a desired set of conditions with a specified objective, a final solution is obtained in a single computer run—thus eliminating the numerous solutions required by the case study approach. When nonlinear 228 S.Dragi}evi}/SJM 4 (2) (2009) 227-238 variables are introduced in problem LP solutions becomes impossible due to the nonlinear nature of the energy balance equations. The iterative technique gets around this difficulty by solving successive linear approximations of the nonlinear equations. With each new solution, the linear approximations are improved. Serbian Journal of Management 4 (2) (2009) 227-238. APPLICATION OF LINEAR PROGRAMMING IN ENERGY MANAGEMENT Snežana Dragićević*a and Milorad Bojićb.

In another embodiment of the invention, the power sources including but not limited to a combination of gas engines, diesel engines and batteries are provided to handle loads. In another particular illustrative embodiment of the invention, a computer program is provided in an Energy Management Processor. The computer program includes but is not limited to computer instructions stored in a computer readable medium that when executed by the Energy Management Processor, perform functions that are useful in accomplishing efficient load sharing and power generation between the power sources when servicing loads on an oil rig. In another embodiment, the computer program includes but is not limited to instructions that use linear algebra to manage the load sharing and power generation.

In another particular illustrative embodiment of the invention, the computer program performs power management to efficiently provide power. In another particular illustrative embodiment of the invention, the computer program performs energy management. In the energy management embodiment, the computer program performs load balancing by managing energy supplied by multiple gas engines, variable frequency electric motors, variable voltage electric motors, various energy storage devices and multiple type hybrid batteries. A direct current (DC) to DC converter is provided between a bank of different type batteries to provide energy to the oil rig to efficiently handle loads during efficient load sharing and power generation between the power sources, including but not limited to multiple gas engines, variable frequency electric motors, variable voltage electric motors, wind driven and water driven DC generators, various energy storage devices and multiple types of batteries.

In another embodiment of the invention, the Energy Management Processor executes the computer program to control the system and provide efficient load sharing and energy management to efficiently manage use of the different batteries and energy sources including but not limited to variable speed engines, multiple gas engines, variable frequency electric motors, variable voltage electric motors, various energy storage devices, DC power generation devices such as wind mills, water driven wheels in a moving water supply and multiple type hybrid batteries. In another embodiment of the invention, the Energy Management Processor executes the computer program to control the diesel engine in reference to an operating state for diesel engines including but not limited to a diesel engine fuel map, the fuel map including but not limited to a speed versus torque curve for the diesel engine to dynamically determine and control an efficient fuel-air mixture provided to the diesel engine generator to control the speed of the diesel engine generator to efficiently service a load. The speed versus torque curve is used by the Energy Management Processor to determine a speed to provide a particular torque based on the speed versus torque curve during efficient dynamic load management. In a particular illustrative embodiment of the invention, the diesel engine generator provides more torque at lower speeds.

In a particular illustrative embodiment, a 50 hertz or 60 hertz diesel engine generator is slowed down to increase torque provided by the diesel engine. For example, slowing down the diesel engine to 30 hertz increases the torque provided by the diesel engine at 60 hertz. A slowdown of the diesel engine to 30 hertz is accomplished by an alternating current (AC) to AC converter that is provided to synthesize 60 hertz to 30 hertz. In another embodiment the Energy Management Processor executes the computer program provides a nonlinear programming computer program to provide efficient load sharing and energy management. The Energy Management Processor reads the speed and torque provided by the two diesel engine generators, the dual fuel engine generator, the DC power sources and the four batteries connected to the DC/DC convert selects an substantially optimal frequency for each of the based on the speed versus torque curve for the two diesel engine generators, the dual fuel engine generator and a mix of using the AC and DC power sources, including but not limited to the DC power sources: batteries 130, 132, 134, 136 and solar battery 140 being charged by solar panel also referred to as solar charger 138 to provide power to service the load 122 and generate power send to AC grid 170.

In another embodiment, the Energy Management Processor using an neural network to read the operating states for all AC and DC power sources, including but not limited to speed and torque provided by the two diesel engine generators, the dual fuel engine generator and the three batteries connected to the DC/DC convert selects an substantially optimal frequency for each of the based on the speed versus torque curve for the two diesel engine generators, the dual fuel engine generator and a mix of using the batteries 130, 132, 134, 136 and solar battery 140 being charged by solar charger 138 to provide power to service the load 122. In another embodiment, reads the speed and torque provided by the two diesel engine generators, the dual fuel engine generator and the three batteries connected to the DC/DC convert selects an substantially optimal frequency for each of the based on the speed versus torque curve for the two diesel engine generators, the dual fuel engine generator and a mix of using the batteries 130, 132, 134, 136 and solar battery 140 being charged by solar charger 138 to provide power to service the load 122.

Turning now to FIG. 1, FIG. 1 is a schematic block diagram a system in one particular illustrative embodiment of a Hybrid Power Generation System 100. As shown in FIG. 1, an Energy Management Processor 110 sends control data and receives status data on communication bus 112 to and from a Dual Fuel Engine Generator 114, Diesel Engine 116, Gas Engine Generator 118, Power Bus 120, Load 122 and DC/DC Converter Controller 124. The DC/DC converter controller 124 sends control data to and receives status and request data from battery 1 130, battery 2 132 and battery 3 124, subsequent batteries N 136 and Solar power storage Battery 140. In an illustrative embodiment battery 1 is a lithium manganese cobalt battery for large transient power requirements, battery 2 is a lithium titanate battery for long life and long duty cycle and battery 3 is a lead acid battery which provides raw power at a low cost.

A Power Bus 120 receives power from Dual Fuel Engine Generator 114, Diesel Engine 116, Gas Engine Generator 118 on a Generator Power Bus 140 and DC power from DC/DC Converter Controller 124 from Batteries 1 through N over Battery Power Bus 142, Wind mill 151 and water driven DC generator 150.

A computer program 126 including but not limited to computer instructions stored in a Computer Readable Medium 128 are executed by the Energy Management Processor 110. In a particular illustrative embodiment the Hybrid Power Generation System 100 Energy Management Processor 110 controls the Hybrid Power Generation System to dynamically and efficiently provide power to meet load requirements for the Load 122.

Figure 2:
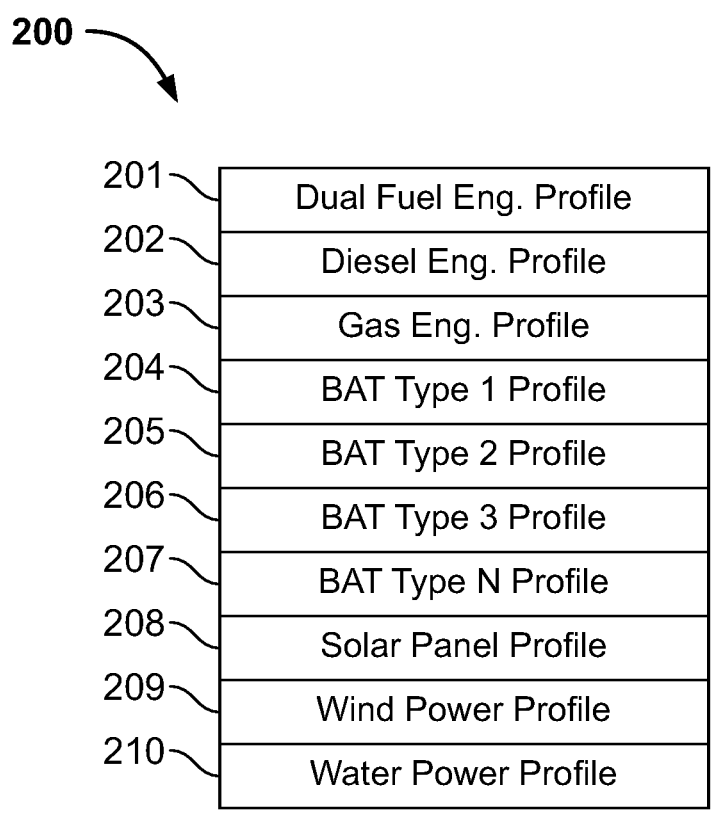
FIG. 2 is a schematic depiction of a data structure for storing power source profiles in a computer readable medium that are used by an energy management processor to efficiently generator power from renewable and nonrenewable energy sources.

Turning now to FIG. 2, a particular illustrative embodiment of a data structure 200 for storing data in the non-transitory computer readable medium for use by the energy management processor is schematically depicted. In a particular illustrative embodiment the data includes but is not limited to a dual engine power source profile field 201 for storing data representing a dual engine power source profile; a diesel engine power source profile field 202 for storing data representing a diesel engine power source profile; a gas engine power source profile field 203 for storing data representing a gas engine power source profile; a battery type 1 power source profile field 204 for storing data representing a battery type 1 power source profile; a battery type 2 power source profile field 205 for storing data representing a battery type 2 power source profile; a battery type 3 power source profile field 206 for storing data representing a battery type 3 power source profile; a battery type N power source profile field 207 for storing data representing a battery type N power source profile; a solar panel power source profile field 208 for storing data representing a solar panel and solar cone power source profile; a wind mill power source profile field 209 for storing data representing a wind mill power source profile; and a water power source profile field 208 for storing data representing a water power source profile.

Figure 3:
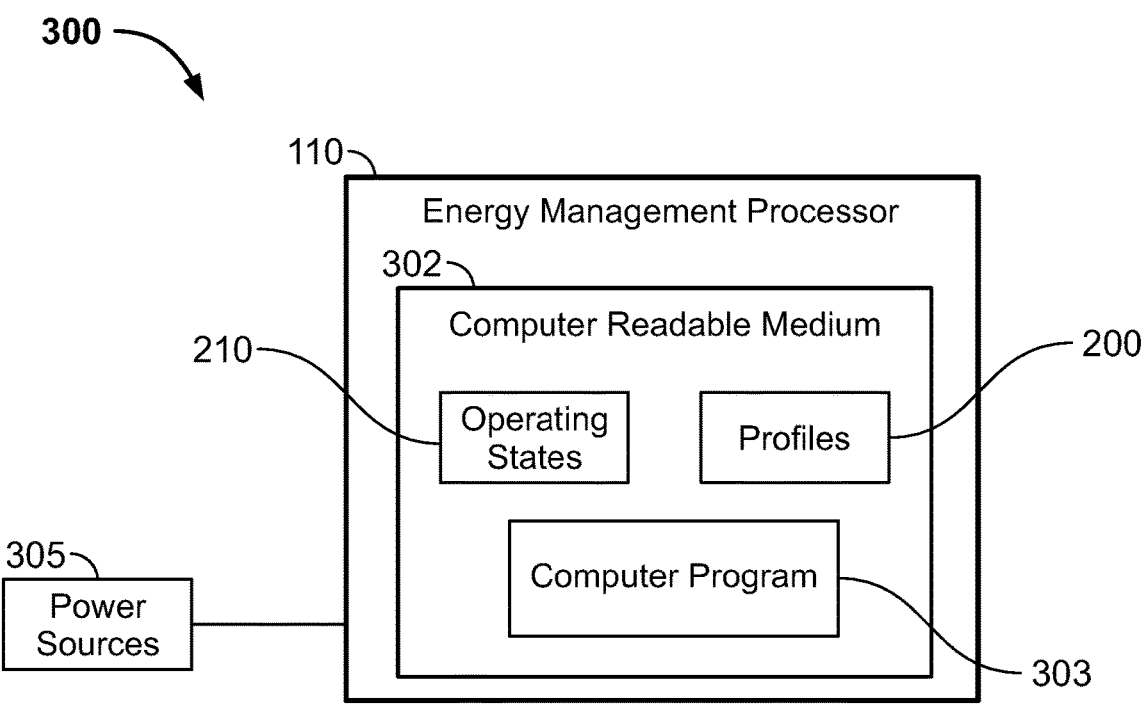
FIG. 3 is a schematic depiction of an Energy Management Processor.

Turning now to FIG. 3, a particular illustrative embodiment of energy management processor is schematically depicted. As shown in FIG. 2, in a particular illustrative embodiment of the invention the energy management process includes but is not limited to a processor 110, a non-transitory computer readable medium 302, profiles 200 stored in the non-transitory computer readable medium. The energy management processor reads data from the profiles 200 and operating states 210 and computer program 303. The computer program included but is not limited to instructions that are executed by the energy management processor 110 to perform the method and control the energy management system disclosed herein. The energy management processor executes the computer program that reads operating states from the AC and DC power sources (shown collectively in FIG. 3 as block 305).

Figure 4:
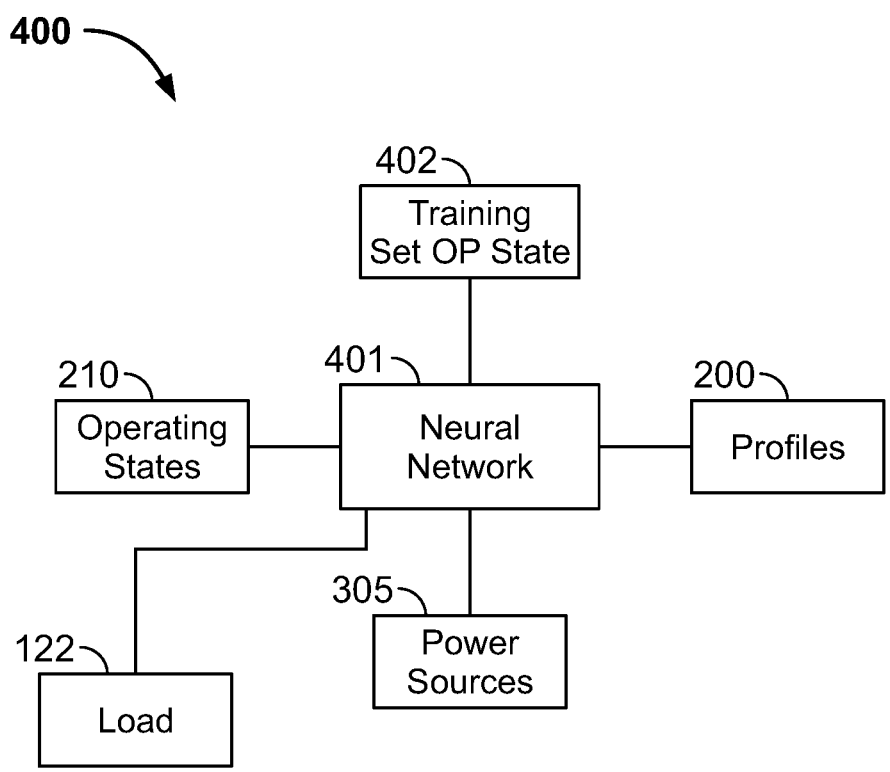
FIG. 4 is a schematic depiction of an Energy Management Processor neural network.

Turning now to FIG. 4, FIG. 4 schematically depicts the computer program stored in the energy management processor, wherein the computer program is a neural network. The neural network is trained by training set 402 and accesses profiles 200 and operating states 210 to train and once trained, to substantially optimize the cost and efficiency of production of energy and provision of energy to load(s).

In another particular illustrative embodiment, the Energy Management Processor system generates a power impulse command to for example, provide a torque impulse to an equipment as described in U.S. Pat. No. 9,365,265 by John B. Janik, issued on May 25, 2016 and entitled "Hybrid Winch with Controlled Release and Torque Impulse Generation". In one particular illustrative embodiment, a torque profile is selected to apply a sharp rise in power provided by the Hybrid Power Generation System to generate a sharp rise in power supplied to, and associated torque generated by, a load such as an equipment including but not limited to a draw works, mud pump, drill, or a jack up rig gearbox motor as described in U.S. patent application Ser. No. 15/415,626 filed Jan. 25, 2017 by Janik and entitled "System and method for controlling a jack up rig" which is hereby incorporated by reference in its entirety and an anchor handling winch to rapidly increase power applied to the equipment and torque generated by the equipment. The stored battery backup power is applied to achieve a more rapid rise in energy supplied, available power generated and impulse torque exerted by the equipment than possible using the electric generator power by itself. In another particular illustrative embodiment, a torque profile is selected by the Energy Management Processor to apply a sharp rise in torque on the winch to rapidly increase tension on the anchor cable to remove the anchor from the sea bed.

In another particular illustrative embodiment, a user input from user input device 125 selecting a torque profile is received by the Energy Management Processor. In another particular illustrative embodiment, a neural network is provided as a computer program in the computer readable medium that is executed by the Energy Management Processor to monitor the operating states of the power sources including but not limited to batteries, engines and generator discussed above and energy supplied to the equipment during operations of raising and lowering jack up rig legs and punch through testing and tension and torque applied to the anchor cable and winch during successful anchor setting operations. The neural network monitors the operating states for of all power sources also referred herein to as "energy sources" during the operations and stores them in the computer readable medium. The neural network stores the monitored operating states of the power sources, including but not limited to batteries, engines and generators discussed above and provided in the Hybrid Power Generation System which supplies to the equipment during raising and lowering jack up rig legs and punch through testing and tension and torque settings and applies the stored energy settings to the during raising and lowering jack up rig legs and punch through testing and tension and torque applies to the anchor cable and winch during successful anchor setting operations. In another particular illustrative embodiment, an expert system is provided as a computer program in the computer readable medium that is executed by the Energy Management Processor to monitor energy supplied by each of the power sources to loads such as including but not limited to the equipment during operations, such as raising and lowering jack up rig legs and punch through testing and tension and torque applied during to the anchor cable and winch during successful anchor setting operations under changing acceptable stability parameters due to changes in loading of the vessel or damage to the vessel. The expert system stores the monitored energy supplied by each of the power sources and also the tension and torque settings and applies the energy to generated the stored tension and torque settings to the winch during anchor handling operations.

In another particular illustrative embodiment of the invention, the computer program is an analytical model that executes instructions to calculate how much electricity the AC and DC power sources produce on the basis of the operating states and profiles for each of the power sources including but not limited to incident solar radiation and other environmental factors, such as temperature, cloud cover, time of day, wind speed, and humidity. The analytical model uses the weather forecast to predict the power sources output at a precise location.

In another particular illustrative embodiment of the invention, the computer program is a neural network. The neural network is trained by providing a training set of parameters supplied by a user. The training set is used to train the neural network to recognize interrelationships between the so that the neural network can substantially optimize efficiency as to cost and energy production in generating energy from the power sources. They neural networks are trained using a training set of data including operation states for the power sources stored in profiles that are based on past data, for example, weather forecasts and the electricity output over time for different load conditions for each one of the power sources. The neural network predicts how much power will be produced by the power sources on the basis of the weather data, load data and historic monitoring of the interrelationships between the operating states for each of the AC and DC power sources under varying load conditions. At first, the software doesn't know what effect the various parameters will have, so its forecast will deviate significantly from the system's actual power output from the combination of power sources. During the training of the neural network, the neural network repeats this process thousands of times to minimize the difference between a forecast by the neural network and the actual values provided by the training set. As training is conducted, the neural network changes the weighting of individual parameters to become more and more precise and accurate in the neural networks substantial optimization of cost and efficiency in producing energy from the power sources and supplying power to a load. The computer program as a neural network provides substantially optimal economical energy production for substantially optimal costs reduction in supplying power to a load and for harvesting substantially all of the energy generated by the DC power sources. The neural network enables the power companies represented by the electrical grid 170 to meet local network operators' forecasting needs regarding the amount of electricity that will be fed into the grid. The neural network analyzes current power flows, the amount of energy being generated from power sources, profiles, weather forecasts, water flow speed and the water levels in pumped-storage electrical power stations.

In another particular illustrative embodiment of the invention, the computer program is an expert system. The expert system recognizes interrelationships between the power sources, operating states and loads so that the expert system can substantially optimize efficiency as to cost and energy production in generating energy from the power sources. They expert system s are trained using a training set of data including operation states for the power sources stored in profiles that are based on past data, for example, weather forecasts and the electricity output over time for different load conditions for each one of the power sources. The expert system predicts how much power will be produced by the power sources based on the weather data, load data and historic monitoring of the interrelationships between the operating states for each of the power sources under varying load conditions. The expert system s substantial optimization of cost and efficiency in producing energy from the power sources and supplying power to a load. The computer program as an expert system provides substantially optimal economical energy production for substantially optimal costs reduction in supplying power to a load and for harvesting substantially all of the energy generated by the power sources. The expert system analyzes current power flows, the amount of energy being generated from power sources, profiles, weather forecasts, water flow speed and the water levels in pumped-storage electrical power stations.

In another embodiment, the computer program is a nonlinear program. The nonlinear program recognizes interrelationships between the power sources, operating states and loads so that the nonlinear program can substantially optimize efficiency as to cost and energy production in generating energy from the power sources. The nonlinear program predicts how much power will be produced by the power sources on the basis of the weather data, load data and historic monitoring of the interrelationships between the operating states for each of the power sources under varying load conditions. The nonlinear program substantially optimizes cost and efficiency in producing energy from the power sources and supplying power to a load. The computer program as a nonlinear program provides substantially optimal economical energy production for substantially optimal costs reduction in supplying power to a load and for harvesting substantially all of the energy generated by the power sources. The nonlinear program analyzes current power flows, the amount of energy being generated from power sources, profiles, weather forecasts, water flow speed and the water levels in pumped-storage electrical power stations.

In another embodiment, the computer program a set of instructions that are executed by the Energy Management processor. The computer program recognizes interrelationships between the power sources, operating states and loads so that the computer program can substantially optimize efficiency as to cost and energy production in generating energy from the power sources. The computer program predicts how much power will be produced by the power sources based on the weather data, load data and historic monitoring of the interrelationships between the operating states for each of the power sources under varying load conditions. The computer program substantially optimizes cost and efficiency in producing energy from the power sources and supplying power to a load during varying load conditions and varying operating states. The computer program provides substantially optimal economical energy production for substantially optimal costs reduction in supplying power to a load and for harvesting substantially all of the energy generated by the power sources. The computer program analyzes current power flows, the amount of energy being generated from power sources, profiles, weather forecasts, water flow speed and the water levels in pumped-storage electrical power stations.

In another particular illustrative embodiment a system is disclosed including but not limited to a processor in data communication with a non-transitory computer readable medium; a hybrid power source for servicing a system load, the hybrid power source comprising a natural gas engine, a diesel engine and a battery; a computer program comprising instructions stored in the non-transitory computer readable medium that are executed by the processor, the computer program comprising, instructions determining a current system load serviced by power provided from the hybrid power source; instructions to determine a current operating state for the natural gas engine, the diesel engine and the battery; instructions to use linear programming to determine a new operating state for the natural gas engine, the diesel engine and the battery to reduce power consumption servicing the current system load the natural gas engine, the diesel engine and the battery; and instructions to replace the current operating state for the natural gas engine, the diesel engine and the battery to the new operating state for the natural gas engine, the diesel engine and the battery. In another particular illustrative embodiment of the invention the operating state comprises a load on the diesel engine, speed of the diesel engine and air fuel mixture supplied to the diesel engine, wherein the operating state further comprises torque of the diesel engine. In another particular illustrative embodiment of the invention the operating state comprises a load on the natural gas engine, speed of the natural gas engine and air fuel mixture supplied to the natural gas engine, wherein the operating state further comprises torque of the natural gas engine. In another particular illustrative embodiment of the invention the operating state comprises a load on the battery.

In another particular illustrative embodiment of the invention a method is disclosed including but not limited to determining using a computer program a current system load serviced by power provided from a hybrid power source for servicing a system load, the hybrid power source comprising a natural gas engine, a diesel engine and a battery; determining a current operating state for the natural gas engine, the diesel engine and the battery; determining using linear programming to a new operating state for the natural gas engine, the diesel engine and the battery to reduce for power consumption servicing the current system load the natural gas engine, the diesel engine and the battery; and replacing the current operating state for the natural gas engine, the diesel engine and the battery to the new operating state for the natural gas engine, the diesel engine and the battery. In another particular illustrative embodiment of the invention the operating state comprises a load on the diesel engine, speed of the diesel engine and air fuel mixture supplied to the diesel engine, wherein the operating state further comprises torque of the diesel engine. In another particular illustrative embodiment of the invention the operating state comprises a load on the natural gas engine, speed of the natural gas engine and air fuel mixture supplied to the natural gas engine, wherein the operating state further comprises torque of the natural gas engine. In another particular illustrative embodiment of the invention the operating state comprises a load on the battery. In another particular illustrative embodiment of the invention the computer program is a linear program. In another particular illustrative embodiment of the invention the computer program is an expert system. In another particular illustrative embodiment of the invention the computer program is a neural network.

In another particular illustrative embodiment of the invention a computer readable medium is disclosed containing instructions that are executed a processor in data communication with a non-transitory computer readable medium to control a hybrid power source for servicing a system load, the hybrid power source comprising a natural gas engine, a diesel engine and a battery, the computer program comprising instructions stored in the non-transitory computer readable medium that are executed by the processor, the computer program including but not limited to instructions to cause the load processor to determine a current system load serviced by power provided from the hybrid power source; instructions for the processor to determine a current operating state for the natural gas engine, the diesel engine and the battery; instructions for the processor to use linear programming to determine a new operating state for the natural gas engine, the diesel engine and the battery to reduce power consumption servicing the current system load the natural gas engine, the diesel engine and the battery; and instructions for the processor to replace the current operating state for the natural gas engine, the diesel engine and the battery to the new operating state for the natural gas engine, the diesel engine and the battery.

In another particular illustrative embodiment of the invention in the computer readable medium, the operating state comprises a load on the diesel engine, speed of the diesel engine and air fuel mixture supplied to the diesel engine, wherein the operating state further comprises torque of the diesel engine. In another particular illustrative embodiment of the invention in the computer readable medium, the operating state comprises a load on the natural gas engine, speed of the natural gas engine and air fuel mixture supplied to the natural gas engine, wherein the operating state further comprises torque of the natural gas engine. In another particular illustrative embodiment of the invention in the computer readable medium, the operating state comprises a load on the battery. In another particular illustrative embodiment of the invention in the computer readable medium, the computer program is a linear program. In another particular illustrative embodiment of the invention in the computer readable medium, the computer program is an expert system.

The present invention can be realized in hardware, software, or a combination of hardware and software. In a specific embodiment, a system according to the present invention can be realized in a centralized fashion in one computer system, or in a distributed fashion where different elements are spread across several interconnected computer systems. Any kind of computer system or other apparatus adapted for carrying out the methods and inventions described herein may be used for purposes of the present inventions. A typical combination of hardware and software could be a general purpose computer system with a computer program that, when being loaded and executed, controls the computer system such that it carries out the methods and inventions described herein.

The figures herein include block diagram and flowchart illustrations of methods, apparatus(s) and computer program products according to various embodiments of the present invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus may be used to implement the functions specified in the block, blocks or flow charts. These computer program instructions may also be stored in a computer-readable medium or memory that can direct a computer or other programmable data processing apparatus to function in a particular manner, such that the instructions stored in the computer-readable medium or memory produce an article of manufacture including instructions which may implement the function specified in the block, blocks or flow charts. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block, blocks or flow charts.

Those skilled in the art should readily appreciate that programs defining the functions of the present inventions can be delivered to a computer in many forms, including but not limited to: (a) information permanently stored on non-writable storage media (e.g., read only memory devices within a computer such as ROM or CD-ROM disks readable by a computer I/O attachment); (b) information alterably stored on writable storage media (e.g., floppy disks and hard drives); or (c) information conveyed to a computer through communication media for example using wireless, baseband signaling or broadband signaling techniques, including carrier wave signaling techniques, such as over computer or telephone networks via a modem, or via any of networks.

The term "executable" as used herein means that a program file is of the type that may be run by the Energy Management Processor 110. In specific embodiments, examples of executable programs may include without limitation: a compiled program that can be translated into machine code in a format that can be loaded into a random access portion of the Computer Readable Medium 128 and run by the Energy Management Processor 110; source code that may be expressed in proper format such as object code that is capable of being loaded into a random access portion of the Computer Readable Medium 128 and executed by the Energy Management Processor 110; or source code that may be interpreted by another executable program to generate instructions in a random access portion of the Computer Readable Medium to be executed by the Energy Management Processor 110. An executable program may be stored in any portion or component of the Computer Readable Medium including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The Computer Readable Medium may include both volatile and nonvolatile memory and data storage components. Volatile components are those that do not retain data values upon loss of power. Nonvolatile components are those that retain data upon a loss of power. Thus, the Computer Readable Medium may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In a specific embodiment, the Energy Management Processor may represent multiple Energy Management Processors and/or multiple processor cores and the Computer Readable Medium may represent multiple Computer Readable Mediums that operate in parallel processing circuits, respectively. In such a case, the local interface may be an appropriate network that facilitates communication between any two of the multiple Processors, between any processor and any of the Computer Readable Medium, or between any two of the Computer Readable Mediums, etc. The local interface may comprise additional systems designed to coordinate this communication, including, for example, performing load balancing. The Energy Management Processor may be of electrical or of some other available construction.

Although the programs and other various systems, components and functionalities described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components. Such technologies are generally well known by those skilled in the art and, consequently, are not described in detail herein.

Flowcharts and Block Diagrams described herein schematically depict the functionality and operation of various specific embodiments of certain aspects of the present inventions. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as an Energy Management Processor in a computer system or other system. The machine code may be converted from the source code, etc. If embodied in hardware, each block may represent a circuit or a number of interconnected circuits to implement the specified logical function(s).

Although the flowchart and block diagram described herein depict a specific order of execution, it is understood that the order of execution may differ from that which is depicted. For example, the order of execution of two or more blocks may be scrambled relative to the order shown. Also, two or more blocks shown in succession may be executed concurrently or with partial concurrence. Further, in some embodiments, one or more of the blocks shown in FIG. 1 may be skipped or omitted. In addition, any number of counters, state variables, warning semaphores, or messages might be added to the logical flow described herein, for purposes of enhanced utility, accounting, performance measurement, or providing troubleshooting aids. It is understood that all such variations are within the scope of the present inventions.

Any logic or application described herein that comprises software or code can be embodied in any non-transitory computer-readable medium, such as computer-readable medium, for use by or in connection with an instruction execution system such as, for example, an Energy Management Processor in a computer system or other system. In this sense, the logic may comprise, for example, statements including instructions and declarations that can be fetched from the computer-readable medium and executed by the instruction execution system. In the context of the present inventions, a "computer-readable medium" may include any medium that may contain, store, or maintain the logic or application described herein for use by or in connection with the instruction execution system.

The computer-readable medium may comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

The Energy Management Processor may further include a network interface coupled to the bus and in communication with the network. The network interface may be configured to allow data to be exchanged between computer and other devices attached to the network or any other network or between nodes of any computer system or the video system. In addition to the above description of the network, it may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, the network interface may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

The Energy Management Processor may also include an input/output interface coupled to the bus and also coupled to one or more input/output devices, such as a display, a touchscreen, a mouse or other cursor control device, and/or a keyboard. In certain specific embodiments, further examples of input/output devices may include one or more display terminals, keypads, touchpads, scanning devices, voice or optical recognition devices, or any other devices suitable for entering or accessing data by one or more computers. Multiple input/output devices may be present with respect to a computer or may be distributed on various nodes of computer system, the system and/or any of the viewing or other devices shown in FIG. 1. In some embodiments, similar input/output devices may be separate from the Energy Management Processor and may interact with the Energy Management Processor or one or more nodes of computer system through a wired or wireless connection, such as through the network interface.

It is to be understood that the inventions disclosed herein are not limited to the exact details of construction, operation, exact materials or embodiments shown and described. Although specific embodiments of the inventions have been described, various modifications, alterations, alternative constructions, and equivalents are also encompassed within the scope of the inventions. Although the present inventions may have been described using a particular series of steps, it should be apparent to those skilled in the art that the scope of the present inventions is not limited to the described series of steps. The specification and drawings are, accordingly, to be regarded in an illustrative rather than a restrictive sense. It will be evident that additions, subtractions, deletions, and other modifications and changes may be made thereunto without departing from the broader spirit and scope of the inventions as set forth in the claims set forth below. Accordingly, the inventions are therefore to be limited only by the scope of the appended claims. None of the claim language should be interpreted pursuant to 35 U.S.C. 112(f) unless the word "means" is recited in any of the claim language, and then only with respect to any recited "means" limitation.

What is claimed is:

1. A hybrid power generation system comprising:
    a processor in data communication with a non-transitory computer readable medium for controlling a plurality of power sources to substantially optimize energy generation by the plurality of power sources, wherein the plurality of power sources comprises a solar panel and a battery that generate energy;
    a computer program comprising instructions stored in the non-transitory computer readable medium that are executed by the processor, the computer program comprising, instructions to determine a current operating state for each of the plurality of power sources;
    instructions to determine a new operating state for each of the plurality of power sources to substantially optimize power generated for each of the power sources;
    instructions to replace the current operating state for each of the plurality of power sources to the new operating state for each of the plurality of power sources; and
    instructions to determine a current system load serviced by the plurality of power sources, wherein the operating states further comprises a load on a diesel engine, speed of the diesel engine and air fuel mixture supplied to the diesel engine, wherein the operating state further comprises torque of the diesel engine.

2. The system of claim 1, wherein the operating state comprises a load on a natural gas engine, speed of the natural gas engine and air fuel mixture supplied to the natural gas engine, wherein the operating state further comprises torque of the natural gas engine.

3. The system of claim 1, wherein the power sources further comprise a plurality of different types of batteries and the operating states further comprises a load on the batteries.

4. The system of claim 1, wherein the computer program is a linear program.

5. The system of claim 1, wherein the computer program is an expert system.

6. The system of claim 1, wherein the computer program is a neural network.

7. A computerized method for producing by from a plurality of power sources, the method comprising:
- determining on an energy management processor, a current operating state for each of the plurality of power sources;
- determining on the energy management processor a new operating state for each of the plurality of power sources to substantially optimize power generated for each of the power sources;
- replacing on the energy management processor the current operating state for each of the plurality of power sources to the new operating state for each of the plurality of power sources; and
- determining a current system load serviced by the plurality of power sources, wherein the operating states further comprises a load on the diesel engine, speed of a diesel engine and air fuel mixture supplied to the diesel engine, wherein the operating state further comprises torque of the diesel engine.

8. The method of claim 7, wherein the operating state comprises a load on a natural gas engine, speed of the natural gas engine and air fuel mixture supplied to the natural gas engine, wherein the operating state further comprises torque of the natural gas engine.

9. The method of claim 7, wherein the power sources further comprise a plurality of different types of batteries and the operating states further comprises a load on the batteries.

10. The method of claim 7, wherein the energy management processor is a linear program.

11. The method of claim 7, wherein the energy management processor is an expert system.

12. The method of claim 7, wherein the energy management processor is a neural network.

13. A computer readable medium contain instructions that are executed
- a processor in data communication with a non-transitory computer readable medium to substantially optimize energy generated by a plurality of power sources;
- a processor in data communication with a non-transitory computer readable medium for controlling a plurality of power sources to substantially optimize energy generation by the plurality of power sources, wherein the plurality of power sources comprises a solar panel and a battery that generate energy;
- a computer program comprising instructions stored in the non-transitory computer readable medium that are executed by the processor, the computer program comprising, instructions to determine a current operating state for each of the plurality of power sources;
- instructions to determine a new operating state for each of the plurality of power sources to substantially optimize power generated for each of the power sources;
- instructions to replace the current operating state for each of the plurality of power sources to the new operating state for each of the plurality of power sources; and
- instructions to determine a current system load serviced by the plurality of power sources, wherein the operating states further comprises a load on a diesel engine, speed of the diesel engine and air fuel mixture supplied to the diesel engine, wherein the operating state further comprises torque of the diesel engine.

14. The medium of claim 13, wherein the operating state comprises a load on a natural gas engine, speed of the natural gas engine and air fuel mixture supplied to the natural gas engine, wherein the operating state further comprises torque of the natural gas engine.

15. The medium of claim 13, wherein the power sources further comprise a plurality of different types of batteries and the operating states further comprises a load on the batteries.

16. The medium of claim 13, wherein the computer program is a linear program.

17. The medium of claim 13, wherein the computer program is a neural network.

* * * * *